United States Patent
Yang et al.

(10) Patent No.: US 8,786,765 B1
(45) Date of Patent: Jul. 22, 2014

(54) MOVEABLE LED ARRAY FLAPS IN IR LED CAMERA

(71) Applicant: Honeywell International Inc., Morristown, NJ (US)

(72) Inventors: Zhi Yang, Shanghai (CN); Gangfeng Gou, Shanghai (CN); Chengjun Tang, Shanghai (CN)

(73) Assignee: Honeywell International Inc., Morristown, NJ (US)

( * ) Notice: Subject to any disclaimer, the term of this patent is extended or adjusted under 35 U.S.C. 154(b) by 47 days.

(21) Appl. No.: 13/737,572

(22) Filed: Jan. 9, 2013

(51) Int. Cl.
*H04N 5/222* (2006.01)

(52) U.S. Cl.
USPC .......................................................... 348/370

(58) Field of Classification Search
USPC .......................................................... 348/370
See application file for complete search history.

(56) References Cited

U.S. PATENT DOCUMENTS

| | | | | |
|---|---|---|---|---|
| 4,591,953 A | * | 5/1986 | Oram | 362/33 |
| 4,729,070 A | * | 3/1988 | Chiu | 362/33 |
| 6,357,893 B1 | * | 3/2002 | Belliveau | 362/285 |
| 8,454,200 B2 | * | 6/2013 | Yang | 362/249.07 |
| 2010/0284184 A1 | * | 11/2010 | Yang | 362/235 |
| 2012/0075861 A1 | | 3/2012 | Yang | |

FOREIGN PATENT DOCUMENTS

CN 201788345 U 4/2011
GB 2 373 569 A 9/2002

OTHER PUBLICATIONS

Search and Examination Report for corresponding GB application 1322524.8 dated Mar. 24, 2014.

* cited by examiner

*Primary Examiner* — James Hannett
(74) *Attorney, Agent, or Firm* — Husch Blackwell LLP

(57) ABSTRACT

An apparatus including a camera housing having an aperture, a camera having an imaging axis disposed in the housing with a lens disposed adjacent the aperture providing a field of view extending outwards through the aperture, around the imaging axis of the camera, at least one light source that illuminates the field of view of the camera, the light source is in an annular space between the lens and periphery of the aperture, at least one flap that supports the at least one light source, the flap extends around the annular space, the flap is pivotally attached to the camera and periphery of the aperture and an actuator that moves the camera along the imaging axis.

20 Claims, 5 Drawing Sheets

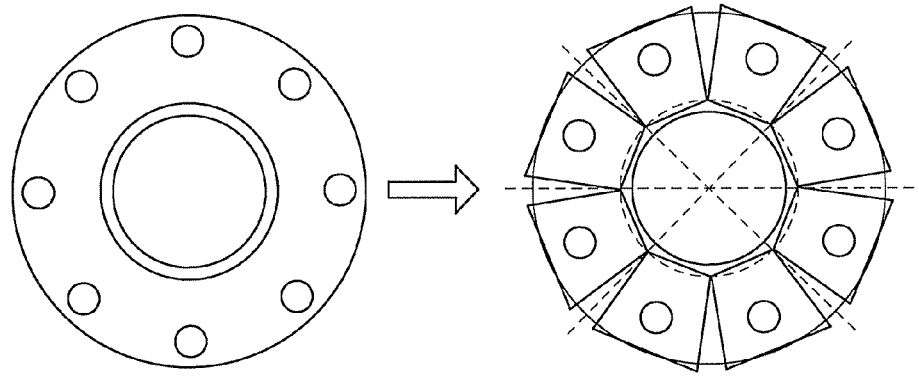
*FIG. 4A*  *FIG. 4B*
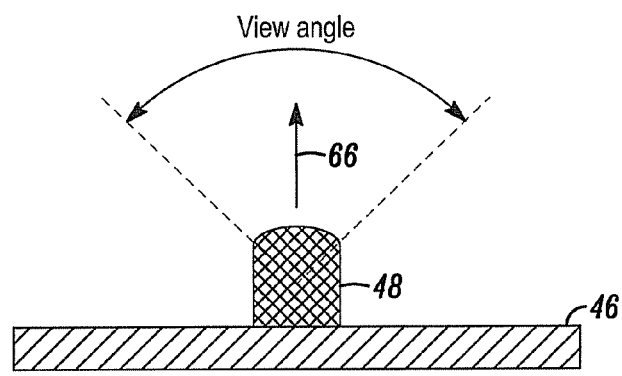
*FIG. 5*

MOVEABLE LED ARRAY FLAPS IN IR LED CAMERA

FIELD

The field of the invention relates to security cameras and more particularly to cameras that operate in low-light conditions.

BACKGROUND

Security systems are generally known. Such systems are typically used to protect a secured area against intruders. In most cases, the secured area is surrounded by a physical barrier (e.g., a fence, the walls of a building, etc.). One or more portals (e.g., doors, windows, etc.) through the physical barrier may provide access points for authorized persons.

One or more sensors may be located around the secured area in order to detect intruders. The sensors may be coupled to an alarm panel within the secured area. Upon the detection of an intruder, the alarm panel may sound a local audible alarm to alert authorized persons within the area of the presence of an intruder.

The alarm panel may also send an alarm message to a central monitoring station. The central monitoring station may respond by summoning the police.

The alarm system may include one or more security cameras. The cameras may be located along the periphery of the secured area or may be located inside to detect intruders that have been able to defeat the physical barrier.

Well cameras work well, they often rely upon ambient lighting in order to detect intruders. In dark areas they may not function properly. Accordingly, a need exists for better methods of providing illumination for the operation of security cameras.

BRIEF DESCRIPTION OF THE DRAWINGS

FIGS. 4A-4B depict details of the camera of FIG. 2;
FIG. 5 depicts details of a light source of the camera of FIG. 2.

DETAILED DESCRIPTION OF AN ILLUSTRATED EMBODIMENT

Figure 1:
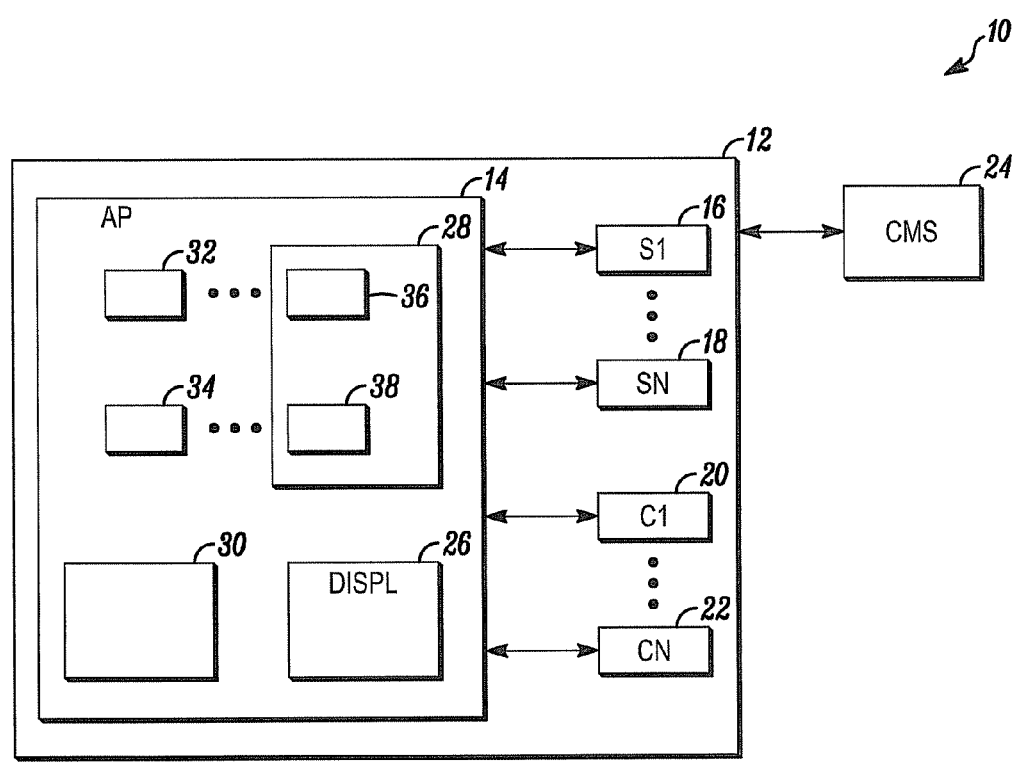
FIG. 1 is a block diagram of a security system under on illustrated embodiment.

While embodiments can take many different forms, specific embodiments thereof are shown in the drawings and will be described herein in detail with the understanding that the present disclosure is to be considered as an exemplification of the principles hereof, as well as the best mode of practicing same. No limitation to the specific embodiment illustrated is intended.

FIG. 1 is a block diagram of a security system 10 shown generally in accordance with an illustrated embodiment. The security system 10 may include an alarm panel 14 located within a secured area 12.

The security system 10 may include a number of sensors 16, 18 for the detection of intruders. The sensors 16, 18 may be coupled to the alarm panel via a set of conductors or may be coupled to the alarm panel wirelessly. The sensors 16, 18 may be limit switches located on doors or windows of the secured area. Alternatively, the sensors 16, 18 may be motion sensors (e.g., PIR detectors) that sense intruders within the protected area 12.

The security system 10 may also include a number of cameras 20, 22. As with the sensors 16, 18, the cameras 20, 22 may be coupled to the alarm panel 14 via wires or may be coupled to the alarm panel 14 wirelessly.

Images from the cameras 20, 22 may be coupled to a display on the alarm panel or control console 26 associated with the alarm panel 14. Associated with the display may be a user interface (e.g., a keyboard) that may be used for control of the cameras 20, 22.

Included within the alarm panel 14 may be a number of processor apparatus (processors) 32, 34, operating under control of one or more computer programs 36, 38 loaded from a non-transitory computer readable medium (memory) 28. As used herein, reference to a program step of programs 36, 38 is also a reference to the processor 34, 36 that executed that step.

Figure 2:
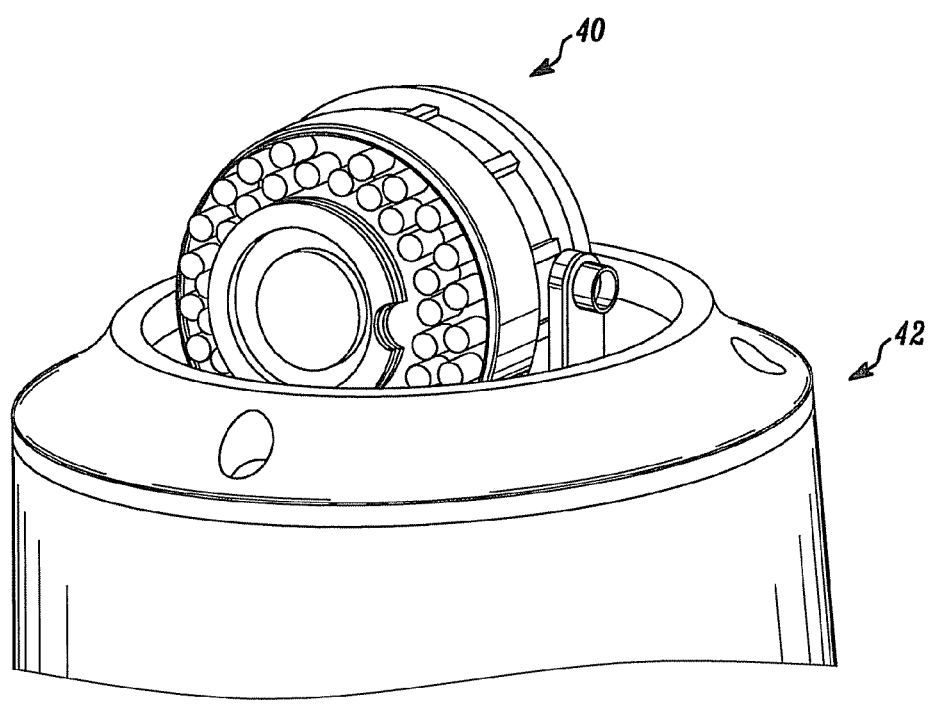
FIG. 2 is a side, perspective view of a camera of the security system of FIG. 1.

FIG. 2 is a side perspective view of a camera 20, 22 of the system 10. As shown in FIG. 2, the camera 20, 22 may include a number of housings 40, 42. The first housing 42 may provide overall support for the camera assembly. The second housing 40 may move relative to the first housing 42 under control of a pan actuator 50 and a tilt actuator 52.

Figure 3:
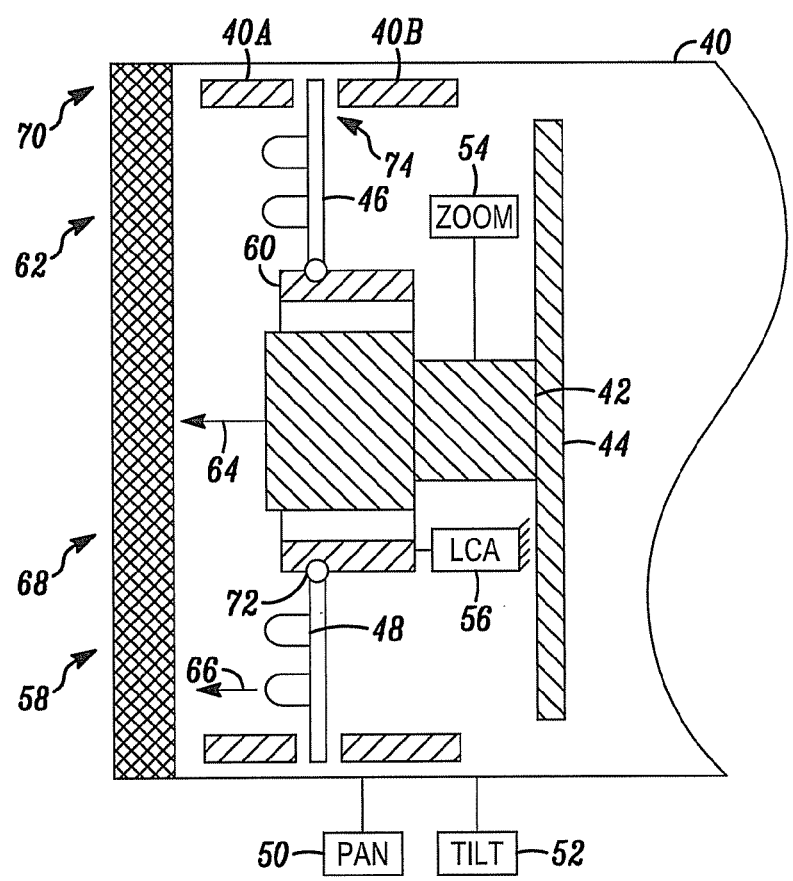
FIG. 3 is a cut-away view of the camera of FIG. 2.

FIG. 3 is a simplified cut-away view of the camera of FIG. 2. A sensor board 44 and lens 42 are located adjacent an aperture 68 in the housing 40. The sensor board 44 includes the image sensing device (e.g., a CCD camera) and associated circuitry.

The lens 42 may be supported by the sensor board 44. A zoom actuator 54 coupled to the lens 42 may provide a zoom capability that allows the camera 20, 22 to change a field of view of the camera 20, 22 by zooming in on distance objects by increasing a magnification of the image detected by the image sensing device. As the camera 20, 22 zooms in on an object, the field of view is reduced. As the camera 20, 22 zooms out, the field of view is increased.

In general, the lens 42 operates to collimate and focus light on the image sensing device. The lens 42 defines an imaging axis 64 of the camera 20, 22 located in the center of the field of view.

Also included within the camera 20, 23 is an adjustable light source 58 located in an annular space 62 between the camera and a periphery 70 of the aperture 68 of the housing 40. The adjustable light source may include a number of light generating devices (e.g., light emitting diodes (LEDs)) 48 and a number of board flaps 46. The board flaps 46 are coupled between a portion 60 of the camera or lens 42 and the housing 40.

FIGS. 4A-B show details of the construction of the board flaps 46 under one illustrated embodiment. As shown in FIG. 4A, an annulus of circuit board material may be provided in a first step. In a second step (as shown in FIG. 4B), the annulus of circuit board material has been cut into a number of board flaps 46.

FIG. 5 shows details of the light sources 48 mounted on the board flaps 46. As shown in FIG. 5, each of the light sources 48 may have a relatively wide angle over which light is emitted. However, the light is predominantly emitted by the light source 48 along an axis of illumination 66.

Under illustrated embodiments, the light control actuator 56 may be used to adjust a light distribution to conform with a field of view of the camera. In this regard, when the zoom actuator 54 zooms out, the camera 20, 22 captures images from a much larger field of view including a much larger area. In this regard, when the zoom actuator 54 zooms in on a distant object, it would be desirable to concentrate the light directed to the distant object over a much smaller area.

In order to adjust the lighting distribution of the light source 58, the lighting control actuator 56 operates to move the camera or the portion 60 of the camera in a direction that is parallel to the imaging axis 64 of the camera towards or away from the aperture 68. This movement operates to tilt each of the board flaps 46 relative to the imaging axis 64 of the camera 20, 22.

For example, a first end of each of the board flaps 46 is pivotally attached to the camera. As shown in FIG. 3, a hinge joint 72 attaches the first end to the camera or portion 60 of the camera. The second end of the board flap 46 may be located in a slot 74 between portions 40A and 40B of the periphery 70 of the housing 40.

Figure 6A:
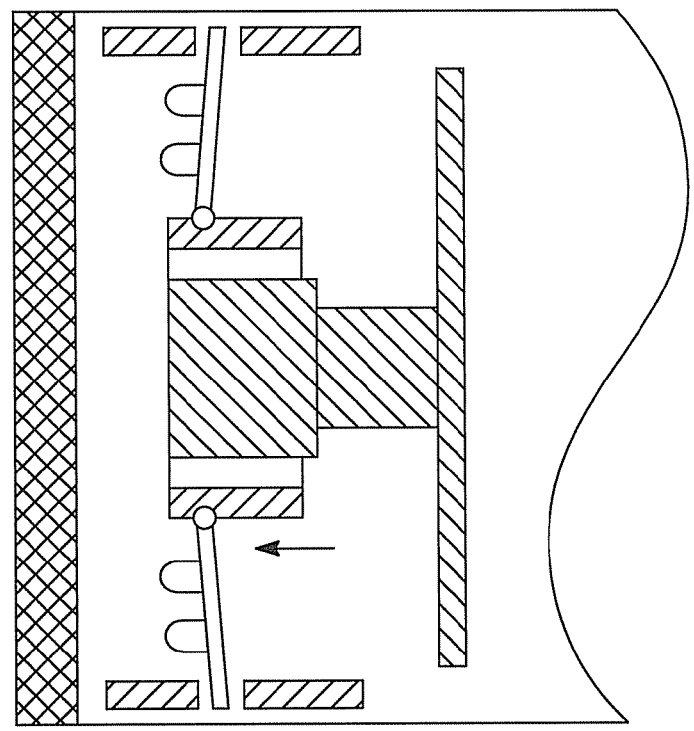
FIGS. 6A-6B show details of the operation of the camera of FIG. 2.
Figure 6B:
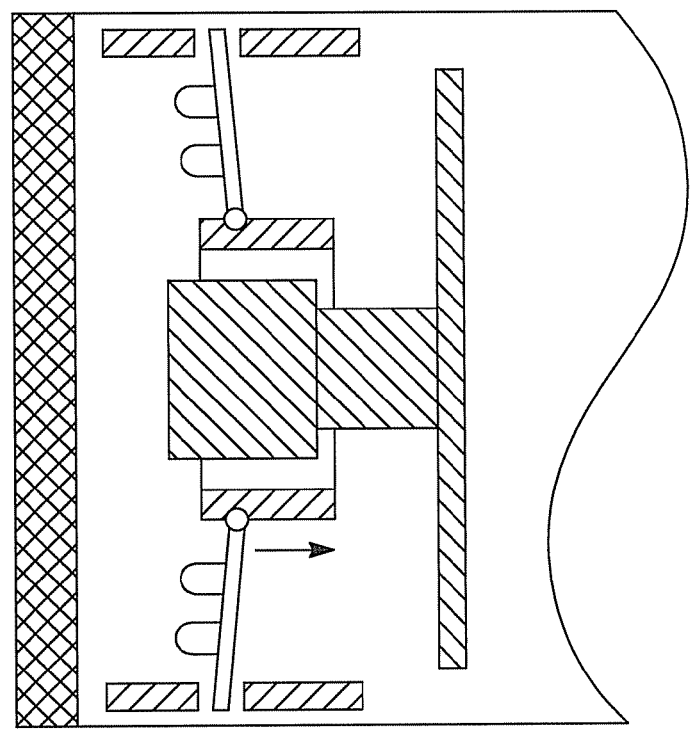

As the actuator 56 moves the camera or portion 60 of the camera towards the aperture 68 (as shown in FIG. 6A), the board flaps 46 (and illumination axis 66) tilt away from the imaging axis 64. Similarly, as the actuator 56 moves the camera or portion 60 of the camera backwards and away from the aperture 68 (as shown in FIG. 6B), the board flaps 46 (and illumination axis 66) tilt towards the imaging axis 64. The direct result of this movement by the light control actuator is that the area of illumination directly in front of the camera can be adjusted to the surveillance needs of the camera 20, 22.

Control of the light control actuator 56 (and size of the area of illumination in the field of view) may be accomplished under any of a number of different methodologies. For example, a keyboard 30 on the control console 26 may be used by a security guard to manually adjust the area of illumination in the field of view of the camera 20, 22.

Alternatively, an illumination processor 32, 34 may monitor a zoom level of the camera via the zoom actuator 54. In this regard, a look up table in memory 28 may be used to retrieve an setting for the illumination actuator 56 that corresponds to each position of the zoom actuator 54. In this way, the size of the area of illumination can be automatically matched to the field of view of the camera.

It should be noted in this regard that when the zoom is increased, the size of the field of view is reduced, but the area viewed may be much further away. However, if the light sources 48 are tilted inwards to concentrate the light on a smaller area, the average illumination in lumens per square foot may be kept constant by concentrating the total light output over a smaller area. This may significantly improve the usefulness of the cameras 20, 22 at night or in areas with poor illumination.

Alternatively, a pan, tilt and zoom processor may activate the appropriate actuators 50, 52, 54 to cause the camera 20, 22 to sweep through a predetermined route within the secure area 12. The pan, tilt and zoom processor may also coordinate the area of illumination with the pan, tilt and zoom positions via the look up table.

In general, the system 10 includes a number of cameras 20, 22. Each of the cameras includes a housing having an aperture. The camera has an imaging axis. The camera is disposed in the housing with a lens of the camera disposed adjacent the aperture providing a field of view extending outwards from the housing through the aperture, around the imaging axis of the camera, at least one light source having an axis of illumination that illuminates the field of view of the camera, the at least one light source is disposed in an annular space between the lens and periphery of the aperture, at least one flap that supports the at least one light source disposed in the annular space, the flap extends at least partially around the annular space, the flap is pivotally attached on a first end to the camera and on a second, opposing end to the periphery of the aperture and an actuator that moves the camera along the imaging axis, the actuator alternatively extends the camera outwards from the housing through the aperture and retracts the camera into the housing, where movement of the camera causes the at least one flap to tilt relative to the imaging axis, where movement of the camera outwards causes the axis of illumination to tilt away from the imaging axis thereby enlarging an illuminated portion of the field of view and retraction causes the axis of illumination to tilt towards the imaging axis thereby reducing an illuminated portion of the field of view.

In another embodiment, the camera has a lens and an imaging axis, with the lens of the camera providing a field of view extending outwards from the camera, around the imaging axis of the camera, at least one light source having a predominant axis of illumination that illuminates the field of view of the camera, the at least one light source is pivotally attached on a first end to the camera and on a second, opposing end to a support that is stationary relative to the camera and an actuator that moves the camera along the imaging axis, the actuator alternatively extends the camera outwards relative to the stationary support and retracts the camera back towards the stationary support, where movement of the camera causes the at least one light source to tilt relative to the imaging axis, where movement of the camera outwards causes the axis of illumination to tilt away from the imaging axis thereby enlarging an illuminated portion of the field of view and retraction causes the axis of illumination to tilt towards the imaging axis thereby reducing an illuminated portion of the field of view.

In another embodiment, the camera has a housing with an aperture. The camera is disposed in the aperture of the housing with a lens of the camera disposed adjacent the aperture providing a field of view extending outwards from the housing through the aperture, around the imaging axis of the camera. The camera includes a plurality of light sources having an predominant field of illumination that illuminates the field of view of the camera, the plurality of light sources equally spaced around an annulus between the lens and periphery of the aperture, a plurality of flaps, each of the plurality of flaps supports at least one of the plurality of light sources disposed in the annular space, each of the plurality of flaps extends at least partially around the annular space, the flap is pivotally attached on a first end to the camera and on a second, opposing end to the periphery of the aperture and a lighting control actuator that moves the camera along the imaging axis, the actuator alternatively extends the camera outwards from the housing through the aperture and retracts the camera into the housing, where movement of the camera causes the plurality of flaps to tilt relative to the imaging axis, where movement of the camera outwards causes the field of illumination to expand outwards and away from the imaging axis thereby enlarging an illuminated portion of the field of view and retraction causes the field of illumination to contract towards the imaging axis thereby reducing an illuminated portion of the field of view.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

The invention claimed is:

1. An apparatus comprising:
   a camera housing having an aperture;
   a camera having an imaging axis, the camera is disposed in the housing with a lens of the camera disposed adjacent the aperture providing a field of view extending outwards from the housing through the aperture, around the imaging axis of the camera;

at least one light source having an axis of illumination that illuminates the field of view of the camera, the at least one light source is disposed in an annular space between the lens and periphery of the aperture;

at least one flap that supports the at least one light source disposed in the annular space, the flap extends at least partially around the annular space, the flap is pivotally attached on a first end to the camera and on a second, opposing end to the periphery of the aperture; and an actuator that moves the camera along the imaging axis, the actuator alternatively extends the camera outwards from the housing through the aperture and retracts the camera into the housing, where movement of the camera causes the at least one flap to tilt relative to the imaging axis, where movement of the camera outwards causes the axis of illumination to tilt away from the imaging axis thereby enlarging an illuminated portion of the field of view and retraction causes the axis of illumination to tilt towards the imaging axis thereby reducing an illuminated portion of the field of view.

2. The apparatus as in claim 1 wherein the at least one light source further comprises a light emitting diode.

3. The apparatus as in claim 1 wherein the at least one light source further comprises a plurality of light sources evenly spaced around the annular space.

4. The apparatus as in claim 3 where the at least one flap further comprises a plurality of flaps, each extends at least partially around the annular space, each pivotally attached on a first end to the camera and on a second, opposing end to the periphery of the aperture and each supporting at least one of the plurality of light sources.

5. The apparatus as in claim 1 further comprising the at least one flap pivotally attached to a lens of the camera.

6. The apparatus as in claim 1 further comprising a security system coupled to and that controls the actuator.

7. The apparatus as in claim 6 further comprising a control panel in a security system to control the actuator.

8. An apparatus comprising:

a camera having a lens and an imaging axis, with the lens of the camera providing a field of view extending outwards from the camera, around the imaging axis of the camera;

at least one light source having a predominant axis of illumination that illuminates the field of view of the camera, the at least one light source is pivotally attached on a first end to the camera and on a second, opposing end to a support that is stationary relative to the camera; and an actuator that moves the camera along the imaging axis, the actuator alternatively extends the camera outwards relative to the stationary support and retracts the camera back towards the stationary support, where movement of the camera causes the at least one light source to tilt relative to the imaging axis, where movement of the camera outwards causes the axis of illumination to tilt away from the imaging axis thereby enlarging an illuminated portion of the field of view and retraction causes the axis of illumination to tilt towards the imaging axis thereby reducing an illuminated portion of the field of view.

9. The apparatus as in claim 8 wherein the support further comprises an aperture that surrounds the camera with an annular space separating a periphery of the aperture and the camera.

10. The apparatus as in claim 8 wherein the support further comprises a housing of the camera.

11. The apparatus as in claim 8 wherein the at least one light source further comprises a flap that supports a light emitting portion of the light source, the flap is pivotally mounted across the annular space between the camera and periphery of the aperture.

12. The apparatus as in claim 11 wherein the at least one light source further comprises a plurality of light sources extending across the annular space and equally spaced around the camera.

13. The apparatus as in claim 8 wherein the at least one light source further comprises a light emitting diode.

14. The apparatus as in claim 8 further comprising a control panel of a security system that controls the actuator based upon images from the camera.

15. An apparatus comprising:

a camera housing having an aperture;

a camera disposed in the aperture of the housing with a lens of the camera disposed adjacent the aperture providing a field of view extending outwards from the housing through the aperture, around the imaging axis of the camera;

a plurality of light sources having an predominant field of illumination that illuminates the field of view of the camera, the plurality of light sources equally spaced around an annulus between the lens and periphery of the aperture;

a plurality of flaps, each of the plurality of flaps supports at least one of the plurality of light sources disposed in the annular space, each of the plurality of flaps extends at least partially around the annular space, the flap is pivotally attached on a first end to the camera and on a second, opposing end to the periphery of the aperture; and a lighting control actuator that moves the camera along the imaging axis, the actuator alternatively extends the camera outwards from the housing through the aperture and retracts the camera into the housing, where movement of the camera causes the plurality of flaps to tilt relative to the imaging axis, where movement of the camera outwards causes the field of illumination to expand outwards and away from the imaging axis thereby enlarging an illuminated portion of the field of view and retraction causes the field of illumination to contract towards the imaging axis thereby reducing an illuminated portion of the field of view.

16. The apparatus as in claim 15 further comprising a console that controls the lighting control actuator.

17. The apparatus as in claim 16 further comprising pan, tilt and zoom actuators controlled by the console.

18. The apparatus as in claim 17 further comprising a programmed processor that controls the light control actuator based upon a pan, tilt and zoom position of the camera.

19. The apparatus as in claim 17 further comprising a programmed processor that automatically selects a plurality of sequential pan, tilt and zoom positions of the camera and a corresponding lighting control actuator position corresponding to each.

20. The apparatus as in claim 15 wherein the plurality of light sources further comprise at least some light emitting diodes.

* * * * *